United States Patent
Antropov et al.

(10) Patent No.: US 7,408,303 B2
(45) Date of Patent: Aug. 5, 2008

(54) PULSED PLASMA ACCELERATOR AND METHOD

(75) Inventors: Nikolay Nikolaevich Antropov, Moscow (RU); Grigory Alexandrovich Diyakonov, Moscow (RU); Michail Michailovich Orlov, Moscow (RU); Garry Alekseevich Popov, Moscow (RU); Valery Konstantinovich Tyutin, Moscow (RU); Vladimir Nikolaevich Yakovlev, Moskovskaya obl. (RU)

(73) Assignee: Gosudarstvennoe Nauchnoe Uchrezhdenic "Gosudarstvenny Nauchno-Issledovatelsky Institut Prikladnoi Mechanik I Elektrodinamiki", Moscow (RU)

( * ) Notice: Subject to any disclaimer, the term of this patent is extended or adjusted under 35 U.S.C. 154(b) by 273 days.

(21) Appl. No.: 10/572,947

(22) PCT Filed: Sep. 20, 2004

(86) PCT No.: PCT/RU2004/000368

§ 371 (c)(1),
(2), (4) Date: Mar. 21, 2006

(87) PCT Pub. No.: WO2005/029927

PCT Pub. Date: May 31, 2005

(65) Prior Publication Data

US 2006/0244385 A1  Nov. 2, 2006

(30) Foreign Application Priority Data

Sep. 22, 2003  (RU) .............................. 2003128090

(51) Int. Cl.
*H01J 7/24* (2006.01)

(52) U.S. Cl. ........................... 315/111.21; 315/111.41; 315/111.61

(58) Field of Classification Search ............ 315/111.21, 315/111.31, 111.41, 111.51, 111.61, 111.71
See application file for complete search history.

(56) References Cited

U.S. PATENT DOCUMENTS 5,619,103 A * 4/1997 Tobin et al. ............ 315/111.21
(Continued)

FOREIGN PATENT DOCUMENTS

RU  2 143 586 C1  12/1999

OTHER PUBLICATIONS

Antropov, N, et al., "High efficiency ablative pulsed plasma thruster characteristics", *Proc. 3rd International Conference on Spacecraft Propulsion Cannes*. Oct. 10-13, 2000, ESAP SP 465, Dec. 2002, 509-516.
(Continued)

*Primary Examiner*—David H Vu
(74) *Attorney, Agent, or Firm*—Rothwell, Figg, Ernst & Manbeck

(57) ABSTRACT

A pulsed plasma accelerator includes two electrodes (1) arranged between dielectric bars (2) made from an ablating material, a discharge channel with an open end part whose walls are defined by the surfaces of electrodes (1) and dielectric bars (2), an energy accumulator (11) and current supplies (14,15) for connecting the electrodes (1) with the energy accumulator (11). The current supplies (14, 15) define in conjunction with the electrodes (1) and the energy accumulator (11) an external electric circuit, with characteristics of the external electric circuit being selected on the condition: $2 \leq C/L$, where C (µF) is the electric capacitance of the external electric circuit, and L is the inductance of the external electric circuit, $L \leq 100$ nH. During operation of the plasma accelerator, quasi-nonperiodic pulse discharges are ignited and maintained in the discharge channel. By providing coordinated parameters of the external and internal circuits, a substantial increase in the efficiency of plasma acceleration is achieved.

23 Claims, 6 Drawing Sheets

U.S. PATENT DOCUMENTS

| | | |
|---|---|---|
| 6,200,102 B1 | 3/2001 | Diaz |
| 6,295,804 B1 | 10/2001 | Burton et al. |
| 7,183,716 B2 * | 2/2007 | Kanarov et al. ........ 315/111.51 |
| 2003/0033797 A1 | 2/2003 | Spanjers et al. |

OTHER PUBLICATIONS

Ziemer, J., et al., "Scaling laws for electromagnetic pulsed plasma thrusters", *Institute of Physics Publishing: Plasma Sources Sci., Technol.*, 10 (2001) 395-405.

* cited by examiner

B - B

PULSED PLASMA ACCELERATOR AND METHOD

CROSS-REFERENCE TO RELATED APPLICATION

This application is a National Phase of International Application Serial No. PCT/RU2004/000368, filed 20 Sep. 2004.

BACKGROUND OF THE INVENTION

The Field of Invention

The invention relates to plasma equipment and plasma processes, in particular, to plasma accelerators and plasma acceleration methods, which may be primarily employed for creating of a propulsive force, for example, a space-borne electric propulsion, as well as for generating of high-speed plasma flows in experimental investigations and model tests. The invention may be also employed for realizing various processes for treatment of products and modification of material properties.

BACKGROUND OF THE INVENTION

It is customary to assume that plasma accelerators are apparatuses designed for ionization of a working substance accompanied by acceleration of an ionized gas (plasma) under the action of electromagnetic force and gas pressure force upon generation of an electric discharge.

Plasma acceleration occurs in plasma accelerators as a result of an electric breakdown in an electrode-to-electrode gap. In steady-state plasma accelerators, the electric discharge time is sufficiently long—the typical breakdown time t is at least 1 second. In pulsed plasma accelerators, the electric discharge is of shorter duration. The pulsed discharge time t is about 1-100 μs.

Pulsed plasma accelerators are currently employed as actuating systems in spacecraft control systems and as pulsed low-temperature plasma injectors.

It is common knowledge that in order to maintain a spacecraft in a desired orbital position during retarding in a relatively dense residual atmosphere of the outer space, it is advantageous to use small-sized propulsion units with low power consumption. Such requirements are satisfied with the use of propulsion units based on pulsed plasma accelerators. Most of such propulsion units use solid dielectric as a working substance releasing gaseous products as a result of ablation under the action of thermal and radiant energy of an electric discharge generated.

There is a great tendency nowadays to a wide employment in the outer space of low-orbiting (with orbit height Horb=400-1 000 km) light-weight and small-sized spacecrafts of relatively simplified construction and low cost, said spacecrafts having the typical weight in the range of from 50 kg to 500 kg. However, these light-weight and small-sized spacecrafts have substantially restricted power supplying capacities of electric propulsions providing high accuracy in keeping of orbital parameters of both individual spacecrafts and groups of such spacecrafts. For this purpose, highly efficient small-sized electric propulsions capable of correcting and stabilizing of spacecraft orbits at the minimal power consumption are demanded.

Steady-state plasma accelerators used as spacecraft controlling electric propulsions have a number of grave disadvantages including the complexity of plasma accelerator construction, the complexity of a manufacture process and operation of an accelerator, the increased manufacture and operating costs, as well as insufficient propulsive efficiency (plasma acceleration efficiency) and low performance reliability at the power consumption of less than 150 W.

An ablation pulsed plasma accelerator is the most promising propulsion for a spacecraft with regard to the simplicity of construction, reliability, low costs and proper functioning at the power consumption of from several watts to hundreds of watts. A pulsed plasma accelerator also provides for maximal accuracy of spacecraft control as compared to other kinds of propulsion units used as actuating systems. However, the efficiency of pulsed plasma accelerators of the prior art does not meet the operative requirements for handling the majority of spacecraft control problems.

A substantial increase in the operating efficiency of a pulsed plasma accelerator, primarily over the range of power consumption of from 20 W to 300 W, within which the basic problems for controlling of spacecraft orbital parameters are currently solved and will be solved in the near future, is of fundamental importance for widening the range of functioning of a spacecraft.

Presently the basic technical problems of a pulsed plasma accelerator are the excessive retardation of evaporation of a working substance with regard to a discharge current and, as a result, ineffective acceleration of a substantial part of plasma generated, which on the whole adversely affects the efficiency of accelerator (the efficiency of plasma acceleration).

It has already been pointed out in the very first studies on the investigation of plasma acceleration processes in a pulsed plasma accelerator (Artsymovitch L. A. et al, "Electrodynamic acceleration of plasma coagulates". ZHETF, Moscow, 1957, vol 33, No. 1) that the plasma acceleration efficiency is dependent upon dimensionless parameter q:

$$q = l^2 C^2 U_0^2 / 2mL_0,$$

where l [H/m] is the linear inductance of accelerator electrodes;

C [F] is the capacity of an external discharge circuit;

$U_0$ [V] is the initial voltage of an external discharge circuit;

m [kg] is the weight of a plasma coagulate;

$L_0$ [H] is the initial inductance of an external discharge circuit.

The physical meaning of the parameter q lies in defining the ratio of a typical value of a magnetic pressure force to a typical value of an accelerated plasma coagulate inertia force. It has been established that an increase in the parameter q results in that a discharge approaches a nonperiodic shape with rising of plasma acceleration efficiency.

One of the known features of a pulsed plasma accelerator is that weight m of accelerated plasma is commonly proportional to the power $W_o$ applied to the discharge:

$$m \approx kW_0,$$

where $W_0 = CU_0^2/2$;

$k=10^{-8}$-$10^{-9}$ kg/J is a proportionality factor.

When the dependence for $W_0$ is introduced in the previous ratio, the dependence for the parameter q assumes the form of:

$$q = l^2 C^2 U_0^2 / 2k(CU_0^2/2)L_0 = (l^2/k)(C/L_0).$$

So, with the assigned configuration and sizes of an accelerating channel of a pulsed plasma accelerator, the efficiency of plasma acceleration is characterized by the ratio of $C/L_0$.

The specific technical solutions aimed at increasing the efficiency of plasma acceleration by means of a pulsed plasma accelerator and associated with the realization of theoretical reasoning of q of about $C/L_o$ are not yet developed.

As an example, it is renowned a pulsed plasma accelerator designed for use as an electric propulsion of a system for controlling the position of a geostationary earth orbit satellite of a global communication system (A. I. Rudikov, N. N. Antropov, G. A. Popov. "Pulsed Plasma Thruster of Erosion Type for a Geostationary Artificial Earth Satellite", 44th Congress of the International Astronautical Federation, IAF-93-S.5.487, Graz, Austria: IAF, Oct. 16-22, 1993). Propulsive pulses generated by such a propulsion unit must neutralize the effects of outer factors upon a spacecraft in a geostationary orbit.

Each pulsed plasma accelerator incorporated in a propulsion unit of the prior art comprises electrodes (a cathode and an anode), one of the electrodes being made in the form of a copper rod and the other of the electrodes being made in the form of a plate, a solid dielectric working substance ablating under the action of an electric discharge, a system for supplying of a working substance into a rail-type discharge channel, and a discharge-initiating system. Power is supplied to accelerator electrodes via current supplies from an outer energy accumulator of 36 µF capacitance at the maximal voltage of about 3 kV.

Such an accelerator operates at a gas pressure less than 10-4 torr in an accelerating channel. The energy released with each pulse is about 160 J at the current pulse amplitude of 35 kA. The disadvantage of the given propulsion unit is low propulsive efficiency, which is less than 10%, owing to an oscillating nature of a discharge current variation during each pulse time.

In another pulsed plasma accelerator of the prior art (P. J. Turchi "Directions for Improving PPT Performance", 25th International Electric Propulsion Conference, IEPC 97-038, USA, Cleveland, Ohio: IEPC, Aug. 24-28, 1997), pulsed oscillating discharges were generated in a discharge channel with power being supplied to electrodes from a high-current capacitive accumulator. The stored energy of the accumulator was 20 J at an initiating voltage of 2 kV, and the accumulator capacitance was 10 µF. The inductance of an external electric circuit was 400 nH. However, despite the attempts of increasing the pulse time and creating a quasi-continuous discharge current at each pulse, the total propulsive efficiency of the propulsive unit did not reach 10%. The obtained propulsive efficiency does not allow such plasma accelerators to be employed in commercial spacecrafts.

With regard to the paper discussed, it should be mentioned that a proper conclusion was drawn on the need for coordination of impedances for internal and external circuits in a pulsed plasma accelerator. However, quite complicated and low-effective solutions are offered for handling the given problem, said solutions including the incorporation of additional components in the electric circuit. The mentioned components, such as capacitors, inductance coils and commutators, allow the internal and external circuits to be coordinated and a quasi-nonperiodic discharge in a pulsed plasma accelerator to be obtained, though the positive effect is substantially reduced by power losses associated with such components.

Apart from the above-mentioned, there exists other viewpoint concerning with an increase in the efficiency of a pulsed plasma accelerator. As an example, a pulsed plasma accelerator (propulsion) is known which comprises an accelerating channel defined by two electrodes, an insulator adapted for separating these electrodes and serving as a working substance, a discharge-initiating system, and an energy accumulator based on high-current capacitors and connected to the electrodes by means of a current supply. The given propulsion uses teflon as a working substance (Gregory G. Spanjers et al. "Investigation of Propellant Inefficiencies in a Pulsed Plasma Thruster", AiAA-96-2723, 32nd JPC, Lake Buena Vista, Fla., USA: AIAA/ASME/SAE/ASEE, Jul. 1-3, 1996). During operation of the propulsion, the influence of electric discharge energy upon the efficiency of use of a working substance was investigated. However, despite the resultant increase in a propulsive pulse and propulsion value, the total propulsive efficiency of the plasma accelerator at the discharge energy of about 40 J varied from 7% to 8%. The relatively low propulsive efficiency was due to the oscillating nature of the discharge current variation during each pulse.

The conclusion was drawn in the discussed paper that in order to increase an efficiency of a pulsed plasma accelerator, the first one half-period time of a discharge current must be reduced and its amplitude must be increased. The above conclusion was supported by reliable experimental results, however it did not take into account nonlinearity of processes occurred in the input electric circuit of the pulsed plasma accelerator and caused by plasma.

In order to increase propulsive characteristics of pulsed plasma accelerators (propulsions), accelerators were designed for high level of electric discharge energy (W. J. Guman and D. J. Palumbo "Pulsed Plasma Propulsion System for North-South Stationkeeping", AIAA-76-999, AIAA International Propulsion Conference, Key Biscayne, Fla., USA: AIAA, Nov. 14-17, 1976). A known pulsed accelerator (propulsion) includes two electrodes defining an accelerating channel, dielectric bars made from teflon and arranged between the electrodes, a ceramic end insulator, and a capacitive accumulator. The capacitance of the accumulator was rated for the generation of an electric discharge of about 750 J in the accelerating channel.

The discharge generated in the discharge channel of the present plasma accelerator is of oscillating type. The maximal total propulsive efficiency of the propulsion at the discharge voltage of 2.5 kW was 25.6%. However, with the indicated level of discharge energy the propulsive efficiency of the plasma propulsion may not be accepted sufficient since the efficiency of competitive plasma (magnetic plasma) propulsions, such as steady-state plasma propulsions, is up to 45% at this energy level.

It is known a pulsed plasma accelerator (propulsion) comprising two flat copper electrodes, two dielectric bars manufactured from an ablating material and arranged between the said electrodes, a discharge-initiating device, and an energy accumulator (N. Antropov et al. "Parameters of Plasmoids injected by PPT", AIAA 97-2921, 33rd AIAA/ASME/SAE/ASEE Joint Propulsion Conference, Seattle, Wash., USA: AIAA/ASME/SAE/ASEE, Jul. 6-9, 1997). An accelerating channel of the plasma accelerator is defined by surfaces of the electrodes and side surfaces of the dielectric bars. The energy accumulator includes five high-current capacitors with the total stored energy of 80-100 J. The operating voltage of the capacitor battery is 2.5-2.8 kV. The inductance of an external electric circuit connected to the electrodes of accelerator was 20 nH. The efficiency of plasma accelerator did not exceed 13% with the energy of electric discharge of 100 J.

The closest analog of the claimed invention is an erosion (ablation) plasma propulsion (accelerator) disclosed in Pat. No RU 2143586 C1 (IPC-6 F03H1/00, H05H1/54, published 27 Dec. 1999). The known analog includes electrodes (a cathode and an anode), which are connected via an ohmic and inductance load to a capacitor (energy accumulator) plates, a ceramic end insulator, which separates the electrodes from one another, and dielectric bars made from ablating material and arranged between the electrodes. The energy accumulator is connected to the electrodes through thin copper busbars (current supplies). The discharge channel walls are defined by the surfaces of electrodes and dielectric bars. The electrodes of the known plasma accelerator are made in the form of plates. A discharge-initiating device (igniter) is located in a slot formed in the end insulator.

The dielectric bars used in the known plasma accelerator are movable toward a discharge channel midline by means of a special moving device (a spring pusher). The dielectric bars are caused to move until abutment against a stop made in the form of a step on the surface of electrode.

Plasma is accelerated in the discharge channel of the plasma accelerator in the following manner. A narrow high-voltage pulse is supplied from a discharge-initiating unit to the electrodes of the discharge-initiating device. A surface breakdown results in generating of a plasma coagulate, which causes short-circuiting of the electrodes in the slot of the end insulator where an electric arc discharge is created. During breakdown, electrodes are at a "waiting" potential. A working substance is evaporated from the surfaces of the dielectric bars by radiant discharge energy, ionized and accelerated by electromagnetic force and gas dynamic pressure.

During operation of a plasma accelerator—analog, cord-shaped stable plasma is generated at the leading end of the accelerating channel to inhibit deposition of a carbon film in this part of the channel and, accordingly, eliminate non-uniform consumption of the working surface of dielectric bars. This phenomenon enhances the stable propulsive characteristics of the accelerator due to the uniform evaporation of the working substance.

The electric discharge in the accelerating channel of the plasma accelerator is of oscillating nature, with the number of one-half periods of pulse discharge current variations being three. As a result, the maximal propulsive efficiency of the plasma accelerator does not exceed 14%.

With the known ablation pulsed plasma accelerator, one of the greatest problems immediately affecting the efficiency characteristics of the accelerator are the working substance losses occurring in the accelerating channel during the plasma acceleration process.

The reason for the working substance losses has to do with space and time discrepancies of the two processes occurring in the accelerating channel of the pulsed plasma accelerator:

a relatively fast process ($t_{pr}$ of about 1.5-3 µs) of formation and acceleration of a discharge current region (a current arc);

a relatively slow process of heating the working surfaces of the working substance bars, ionization of the working substance, generation of a plasma flow and acceleration thereof ($t_{pr}$ is about 7-12 µs).

The total oscillatory electric discharge time of the known pulsed plasma accelerator-analog is 8-15 µs depending on the sizes of the accelerating channel and the features of the discharge circuit. However, as it had been established, an effective electromagnetic process for plasma acceleration occurred only during the first discharge of the accumulator (the first one-half period of the discharge current), with the time of the said discharge making from 1.5 to 3.0 µs depending on the energy and sizes of the accelerator. Furthermore, in the course of the discharge process, only the ablation (evaporation) of the working substance and thermal (gas dynamic) plasma acceleration had occurred.

DISCLOSURE OF THE INVENTION

The invention is aimed at increasing the share of a working substance effectively accelerated by the electromagnetic force in an accelerating channel of a pulsed plasma accelerator by using the synchronized processes of intensive ablation of dielectric bars and generation of the three-dimensional electromagnetic force and using said force for acceleration of an ionized working substance. Synchronization of the above processes may be provided by the greatest possible approximation of impedances of external and internal electric circuits of a plasma accelerator.

Technical results achievable by utilizing the invention are as follows: increased efficiency in the use of a working substance, reduced electric power losses in an external electric circuit and increased efficiency of plasma acceleration in a discharge channel of a pulsed plasma accelerator (propulsion efficiency of a pulsed plasma accelerator used as an electric propulsion). The given technical results are correlated with one another and on the whole determine the effectiveness of a pulsed plasma accelerator and a plasma acceleration process.

The above results are achieved through the use of a pulsed plasma accelerator comprising two electrodes, dielectric bars manufactured from ablating material and arranged between the said electrodes, a discharge channel with an open end part and walls defined by the surfaces of electrodes and dielectric bars, an energy accumulator, current supplies adapted for connecting of the electrodes to energy-storage accumulators and defining in conjunction with the electrodes and the accumulator an external electric circuit, an insulator arranged between the electrodes at the end part of the discharge channel opposite the open end part, and a discharge-initiating device.

According to the present invention, the plasma accelerator is characterized in that parameters of the accelerator external circuit are selected on the basis of the following condition:

$$2 \leq C/L \leq 5,$$

where C is electric capacitance of the external electric circuit, µF;

L is inductance of the external electric circuit, nH, with the value of inductance being selected on condition of L≦100 nH.

The above conditions for selecting the parameters of the external electric circuit (C and L) actually mean that, concentrated in the accumulator, the electric capacitance of discharge circuit of the accelerator may increase from the level of about 10-30 µF common for a pulsed plasma accelerator to the level of about 40-500 µF depending on the level of discharge energy and the inductance L of the external electric circuit of the pulsed plasma accelerator.

Selection of the range of L and C values was inspired by the following considerations.

With an increase in the circuit capacitance concentrated in the accumulator, the time of the first one-half period of the electric discharge rises from about 1.5-3 µs to about 7-10 µs, the discharge being transformed from a sine glow discharge with characteristic number of one-half periods of from 4 to 6 into a quasi-nonperiodic discharge, with the result that this influences significantly on the physical mechanism of the process in the accelerating channel of pulsed plasma accelerator.

With the selected conditions for the pulsed plasma accelerator at relatively low discharge energy of about 20-60 J, a discharge current pulse with two oscillation one-half periods may be produced, with the energy of the second discharge of the accumulator being less than 20% of the energy of the first discharge.

According to the present view, only 20-40% of the working substance evaporated from the dielectric wall surface escape from the accelerating channel of the pulsed plasma accelerator at speeds of the order of 20-30 km/s. It is the part of the working substance that is accelerated by a three-dimensional electromagnetic force (J×B) resulting from the interaction of the discharge current with the self-magnetic field. The remaining 60-80% of the working substance escape from the accelerating channel of the pulsed plasma accelerator at subthermal and thermal speeds of about 0.5-5.0 km/s. This is due to the fact that there is no time available for the evaporated working substance to interact with the discharge current during the current pulse time. As a consequence, the weighted mean rate values of plasma at the accelerating channel outlet end with acceptable values of a single propulsive pulse do not normally exceed 8-12 km/s. This is characteristic for a propulsion with a "fast" current one-half period ($\leq 3$ µs). An increase in the current one-half period time results in an increase in the mass of the working substance that is effectively accelerated by an electromagnetic force, and, accordingly, in an increase in the propulsive efficiency of the plasma accelerator.

The weighted mean rate of flow of the working substance escaping from the accelerating channel with the time of first one-half period of ~7-10 µs is 15-22 km/s, which is sufficiently close to the speed of a current arc (discharge current) along electrodes of the pulsed plasma accelerator. According to the calculations, such a rate is 25-30 km/s for the pulsed plasma accelerator under consideration and is the maximum plasma flow rate. It is obviously not 20-40% of the working substance that are involved in an electromagnetic acceleration process, as it commonly occurs in case of a "fast" discharge, but about 70% of the working substance generated in the accelerating channel. The given phenomenon was supported by the results of experimental investigations with laboratory models of pulsed plasma accelerators.

With regard to an increase in the efficiency of a pulsed plasma accelerator, of importance is a substantial reduction (by 30-40%) in the consumption of a working substance. Such a reduction occurs with an increased discharge time. The phenomenon is attributable to the decreased discharge current amplitude and, as a consequence, the decreased intensity of energy emission from the current arc zone. The emission of the current arc is the basic condition for heating and evaporating of the dielectric working substance.

The decreased consumption of the working substance is also attributable to the variations in the discharge current dynamics in the pulsed plasma accelerator. Such variations are due to the fact that the zone with higher density of current channels (the current arc) comes out immediately to the edges of electrodes, as in the case with analogs of the pulsed plasma accelerators. However, contrary to the known analogs, the discharge does not die out in the given zone during recharging of an accumulator (with following reversal to the leading part of the discharge channel), but is in a fixed position for 5-6 ms. So, the current density zone is relatively far from the working substance bars for a relatively prolonged time interval to result in substantially reduced evaporation of the bars.

Also, reduction in the losses of energy in an external electric circuit may play a crucial role in increasing of propulsive efficiency of a pulsed plasma accelerator. Reduction of losses occurs primarily in the capacitive energy accumulator due to the improved coordination of parameters of the external electric circuit (the energy accumulator, current supplies for supplying of current to the electrodes) and the internal electric circuit (the current arc-electrodes) of the pulsed plasma accelerator.

According to the previously obtained test data, the characteristic inductance level of the external circuit in the pulsed plasma accelerators of the known types is at least 100 nH and the capacitance is about 10-30 µF. So, the external circuit impedance calculated from an expression $Z_{ext}=2(L/C)^{1/2}$ is about 200 mOhm (the active electrical resistance of the circuit may be neglected due to its low value as compared to the reactive electrical resistance).

The internal circuit impedance dependent on the linear inductance l of the discharge channel and speed V of the current arc is calculated from the dependence: $Z_{int}=l \cdot V/2$. The internal circuit impedance is in the average about an order of magnitude lower than the external circuit impedance and is about 20 mOhm.

Inadequate coordination of the external and internal electric circuit impedance results in dissipation of a significant part of discharge energy in the external electric circuit, primarily in the energy accumulator having relatively higher active electrical resistance, which is due to the development of an oscillation process in the external electric circuit. In such a case the current curve is shaped as an attenuating sine. However, as it had been experimentally established, the current arc effectively accelerates plasma only during the first one-half period of discharge current, when significant energy is applied to the discharge and electromagnetic force (J×B) is of substantial value.

In the claimed pulsed plasma accelerator, the external electric circuit impedance $Z_{ext}$ may be ~40 mOhm, which is due to the optimization of the external circuit by selecting the parameters C and L in accordance with the above conditions. The given impedance level is substantially closer to that of the internal electric circuit than in the known analogs. So, with the exploitation of the present invention, the parameters of the external and internal electric circuits are maximally coordinated without complicating of the power supply system and additional power losses.

Based on test data, the efficiency of plasma acceleration process in the pulsed plasma accelerator, according to the embodiment of the present invention, was in the range from 12% to 35%, with the consumed energy varying from 20 to 150 J.

The indicated efficiency of the pulsed plasma accelerator is in the average about twice as large as the propulsive efficiency of the known accelerators-analogs for the range of the consumed energy under discussion. Furthermore, the approximation dependences have shown that with the values of up to 500 J, the propulsive efficiency of the claimed pulsed plasma accelerator may also be about twice as large as that of the prototype accelerator.

With an increase in the consumed energy, the overranging of said efficiency tends to decrease so that with the power of 0.9-1.0 kJ the efficiency values of the claimed pulsed plasma accelerator and that of the prototype accelerator are much the same. This is due to an inevitable approximation of critical parameters (L and C) of their electric circuits and also due to an increase in the discharge voltage with the rise of the consumed energy.

On the basis of the above grounds, a limitation of $2 \leq C/L \leq 5$ is imposed on the characteristics of the external electric circuit of the pulsed plasma accelerator. The given condition outlines a limitation on the level of energy accumulated in the accumulator. The most significant increase in the efficiency of plasma acceleration process as compared to that of the prototype accelerator is provided when the above condition is observed.

The inductance of the external electric circuit of the claimed pulsed plasma accelerator is preferably selected in the range of L=20-100 nH. The above-cited condition is also aimed at keeping a substantial increase in the efficiency of plasma acceleration process with the exploitation of the claimed pulsed plasma accelerator as compared to the prototype plasma accelerator.

It has been found on the basis of investigation results that an increase, not forming part of the invention, in the external electric circuit inductance by more than 100 nH leads to the gradual approximation of parameters of the prototype accelerator. It should be taken into consideration that the minimal energy consumption must be appropriate to the minimal circuit inductance. The value of inductance L below 20 nH in a workable electric circuit of a pulsed plasma accelerator is practically unrealizable with acceptable conditions for the given type of apparatuses.

In order to simplify the construction of the pulsed plasma accelerator, electrodes may be made in the form of plates.

The length of electrodes is preferably surpassing the section size of dielectric bars in the direction of plasma acceleration to provide for additional increase in the efficiency of plasma acceleration process.

The dielectric bars may be made movable toward a discharge channel midline. The accelerator is equipped with retainers for fixing the dielectric bars in an appropriate position and with a device for moving the latter. The present embodiment of the accelerator allows the operating time of the pulsed plasma accelerator to be substantially increased without replacement of dielectric bars.

The insulator arranged between the electrodes may be equipped with a slot facing an accelerating channel. Such an embodiment of the pulsed plasma accelerator improves the uniformity of evaporation of working substance from dielectric bar surface with time.

In order to eliminate deposition of carbon of the working substance (teflon or fluoroplastic) on the surface of dielectric bars of the preferred embodiment of the pulsed plasma accelerator, the insulator arranged between the electrodes is equipped with protrusions facing the dielectric bars. In this case, the dielectric bars are provided with slots configured in conformance with the protrusions of the insulator.

Each of the dielectric bars may be equipped with at least one longitudinal protrusion facing the respective electrode. Such an embodiment of dielectric bars and electrodes allows ineffective losses of the working substance to be reduced.

It is desirable that the surfaces of the dielectric bars facing the discharge channel be made beveled with respect to the midline of the discharge channel.

In such a case, the distance bmin between the opposite surfaces of the dielectric bars on the side of an end insulator and the distance bmax between the opposite surfaces of the dielectric bars on the side of the open end of the discharge channel must meet the condition: $b_{max}/b_{min} \geq 1.2$. The present embodiment of the pulsed plasma accelerator allows the plasma acceleration process to be stabilized with time.

In order to improve the efficiency of plasma acceleration process, in another preferred embodiment of the pulsed plasma accelerator the parts of electrodes arranged behind the dielectric bars in the direction of plasma acceleration may be positioned at an angle α with respect to the discharge channel midline, the angle α being selected on the condition that $10° \leq \alpha \leq 40°$.

For increasing the efficiency of plasma acceleration process in the accelerating channel of the pulsed plasma accelerator, the parts of electrodes arranged behind the dielectric bars in the direction of plasma acceleration may be made continuously narrowing in the direction of plasma acceleration. The maximal width $d_{max}$ and the minimal width $d_{min}$ of the electrodes are selected in accordance with the condition: $d_{max}/d_{min} \geq 2$.

It is also advisable that the length and width of one of the electrodes serving as an anode exceed the length and width of the other electrode serving as a cathode. An increased length of the anode allows the uniformity of current density to be achieved at the surface of electrodes in the pulsed plasma accelerator, particularly, on their end parts adjacent to the discharge channel edge. The result is that with minimal sizes and weight of the electrodes, the performance reliability of the pulsed plasma accelerator is improved. The given result is gained by eliminating the operating modes involving an increased local current density, at which breakdown of the anode may occur.

The possibility of achieving the above result is attributable to the following physical processes supported by the test data.

In the part of the discharge channel of the accelerator defined by the dielectric bars, the concentration of plasma at the anode is twice as large as the concentration of plasma at the cathode. The dielectric bars are consequently consumed more intensively near the surface of anode as compared to the consumption of dielectric bars near the surface of cathode. A discharge spot occupies the larger area on the anode than on the cathode. In case the electrodes are of equal size (area), in particular of width, the major part of the discharge current is concentrated at the longitudinal edges of the anode. As a result of this phenomenon, the edges of the anode are subjected to enhanced erosion with subsequent destruction thereof. An increased width of anode as compared to that of cathode substantially reduces the probability of development of the given adverse phenomenon owing to the increased uniformity of current density over the surfaces of electrodes.

The speed of advancement of the discharge spot along the surface of anode behind the edges of dielectric bars is greater than the speed of advancement of the discharge spot over the surface of cathode by 30% due to the Hall effect which shows itself in turning (inclining) of the current arc relative to the surface of electrodes in the direction of plasma acceleration. An increase in the length of anode (as compared to that of cathode) eliminates holding of the discharge spot on its outside edge and, accordingly, reduces the probability of destruction of the electrode thanks to the increased uniformity of the discharge current density at the surface of electrodes.

The above technical results are also achieved by effectuating a method for plasma acceleration, which includes the steps of igniting a discharge in the discharge channel of the pulsed plasma accelerator by means of a discharge-initiating device and pulsed supplying of a discharge voltage from the energy accumulator through the external electric circuit to the plasma accelerator electrodes between which are arranged dielectric bars of ablating material. According to the present invention, quasi-nonperiodic pulsed discharges may be ignited in the discharge channel and maintained at the discharge voltage U of at least 1 000 V and the external electric circuit characteristics satisfying the condition: $2 \leq C/L \leq 5$, where C is the capacitance of the external electric circuit, μF, L is the inductance of the external electric circuit, nH, with the value of capacitance being selected on the condition: $L \leq 100$ nH.

In accomplishment of the claimed plasma acceleration method, the impedance of the external electric circuit may maximally approach the impedance of an internal electric circuit. Such coordination of parameters of the electric circuits is reached without employment of additional apparatuses and, as a consequence, without additional energy losses. The result is that the efficiency of the plasma acceleration process with the consumed energy in the range of 20 to 150 J is about twice as large as the propulsive efficiency of the known pulsed plasma accelerators. In accomplishment of the claimed method, the plasma acceleration process goes on in a stable manner and is characterized by a highly effective consumption of the working substance.

The quasi-nonperiodic discharges are ignited and maintained with the external electric circuit characteristics selected on the basis of the condition: $2 \leq C/L \leq 5$. The given condition offers the limitation of the discharge energy level at which a substantial increase of plasma acceleration efficiency and working substance consumption is shown as compared to the known plasma acceleration methods.

The approximation dependences evidence that up to the discharge energy value of about 500 J, the propulsive efficiency of the plasma acceleration method exceeds the efficiency of the known methods-analogs by as much as 2-2.5 times. With the discharge energy above 1 000 J, however, the efficiencies of the plasma acceleration processes of the claimed method and that of the known methods-analogues approach close to one another.

It had been also established by investigations that the effect of substantial increase in the efficiency of plasma acceleration process showed itself at a voltage of no more than 2,000 V. With the indicated voltage limitations, the maximal discharge energy is about 1 000 J.

In terms of the set dependences, it is advisable that quasi-nonperiodic pulsed discharges be generated and maintained with the discharge voltage U in the range of 1 000-2 000 V.

It is also desirable that the inductance L of the external electric circuit be selected in the range of L=20-100 nH. The above additional limitation is also targeted at keeping the significant overranging of the efficiency of plasma acceleration process when realizing a preferred embodiment of claimed method as compared to a prototype method. It had been revealed by experimental investigations that an increase, not forming part of the invention, in the inductance of the external electric circuit of more than 100 nH led to a gradual approximation of parameters of the claimed method and the known one.

In order to simplify the plasma accelerating apparatus, plate-shaped electrodes were used.

The length of electrodes preferably exceeds the section size of dielectric bars in the direction of plasma acceleration. The given embodiment of the means for realizing the method allows the efficiency of plasma acceleration process to be further increased.

It is advisable that during plasma acceleration process the dielectric bars be moved toward the discharge channel midline until the bars are in fixed position with respect to the surfaces of electrodes. The given embodiment of the means for realizing the method allows a continuous plasma acceleration process to be provided without replacement of the dielectric bars.

It is advisable that plasma acceleration be performed in a discharge channel, wherein the surfaces of dielectric bars be made beveled with respect to the discharge channel midline. The distance $b_{min}$ between the opposite surfaces of the dielectric bars on the side of the insulator and the distance $b_{max}$ between the opposite surfaces of the dielectric bars on the side of an open end of the discharge channel must satisfy the condition: $b_{max}/b_{min} \geq 1.2$.

The given embodiment of the apparatus allows the plasma acceleration process to be stabilized with time. It was experimentally established that during operation of the claimed pulsed plasma accelerator, the maximal consumption of the working substance (dielectric bars) occurred not in the mid portion of the discharge channel, as it is normally with the known analogs of a pulsed plasma accelerator, but adjacent to the outlet section of the discharge channel. The process results in a gradual "turning around" of the working surfaces of the dielectric bars. The process is sufficiently prolonged and it takes discharges on the order of 105 of the energy accumulator. Characteristics of the pulsed plasma accelerator vary (toward an increase) during the above process. The above version of the embodiment of dielectric bars is aimed at reducing the time of running-in of the channel of the pulsed plasma accelerator and at stabilizing the characteristics of plasma acceleration working process, beginning with the first starting of the accelerator.

Plasma is preferably accelerated in the discharge channel, wherein the parts of electrodes arranged behind dielectric bars in the direction of plasma acceleration are positioned at an angle $\alpha$ with respect to the discharge channel midline. The angle $\alpha$ is selected on the condition: $10° \leq \alpha \leq 40°$. With the above conditions, the efficiency of plasma acceleration process is further improved.

It is also advisable that the plasma acceleration process be provided in the discharge channel, wherein the parts of electrodes arranged behind the dielectric bars in the direction of plasma acceleration be made continuously narrowing in the direction of plasma acceleration. The maximal width $d_{max}$ and minimal width $d_{min}$ of the electrodes are selected in accordance with the condition: $d_{max}/d_{min} \geq 2$. In this case the linear inductance of the discharge channel is increased to produce a beneficial effect on the coordination of the external and internal electric circuit parameters. As is evident from the experiments, the efficiency of plasma acceleration process is further increased by 10-12% with the use of continuously narrowing electrodes as compared to rectangular electrodes.

It is advisable that plasma acceleration be provided in a discharge channel defined by an insulator equipped with a slot arranged on the discharge channel side. Such an embodiment of the pulsed plasma accelerator used as a means for realization of the plasma acceleration method allows the uniformity of evaporation of the working substance from the surfaces of dielectric bars to be increased with time and, accordingly, the efficiency of plasma acceleration process to be further increased.

In the preferred embodiment, plasma acceleration is performed in the discharge channel wherein the length and width of one of the electrodes serving as an anode exceeds those of the other electrode serving as a cathode. The given version of the embodiment allows erosion of anode edges to be minimized and, as a consequence, their destruction to be avoided with minimal sizes and weight of electrodes.

BRIEF DESCRIPTION OF DRAWINGS

The group of inventions is illustrated by describing specific examples of realization with reference to the drawings appended.

DESCRIPTION OF A PREFERRED EMBODIMENT OF THE INVENTION

Figure 1:
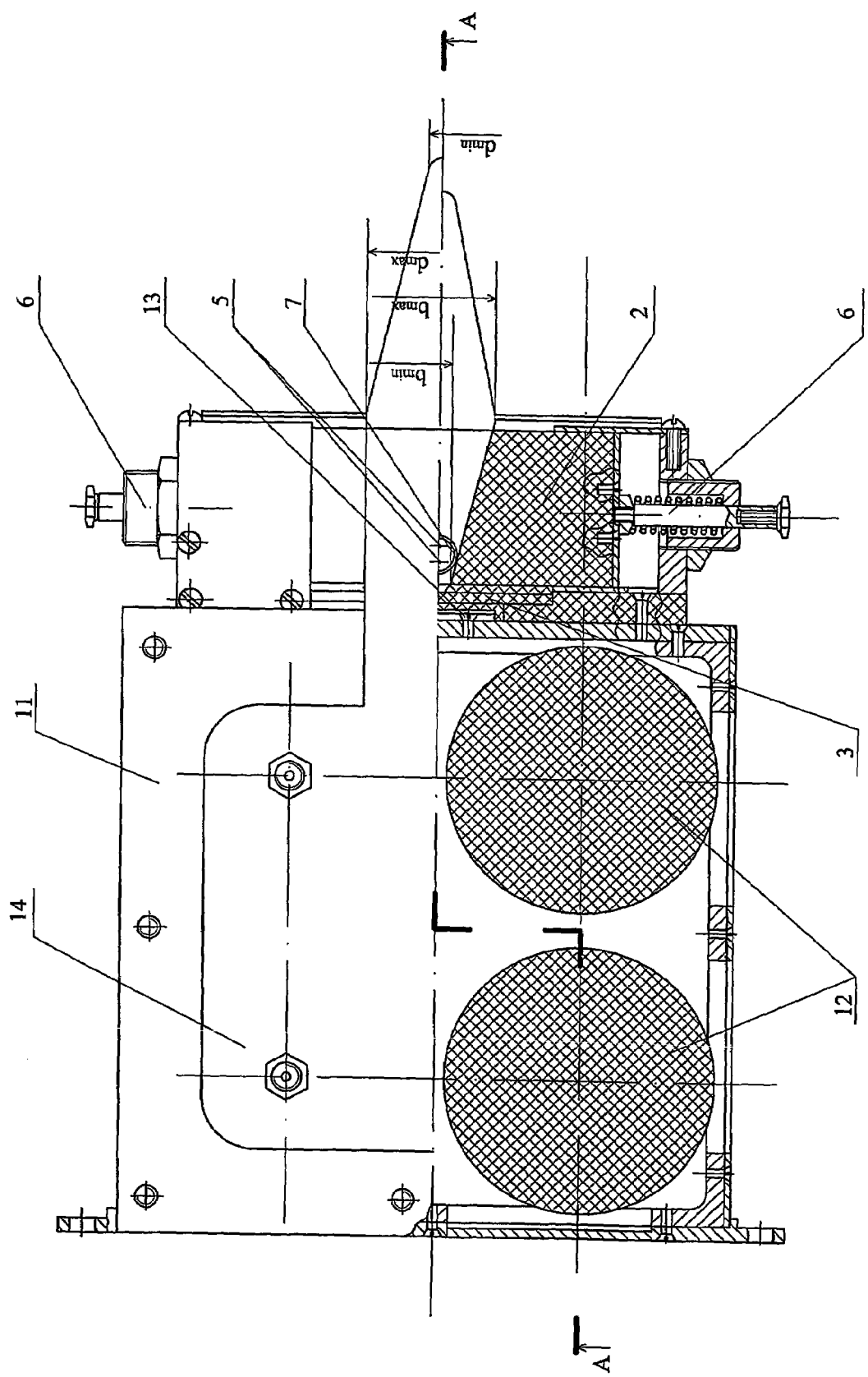
FIG. 1 shows a side view of the pulsed plasma accelerator realized in accordance with the present invention.
Figure 2:
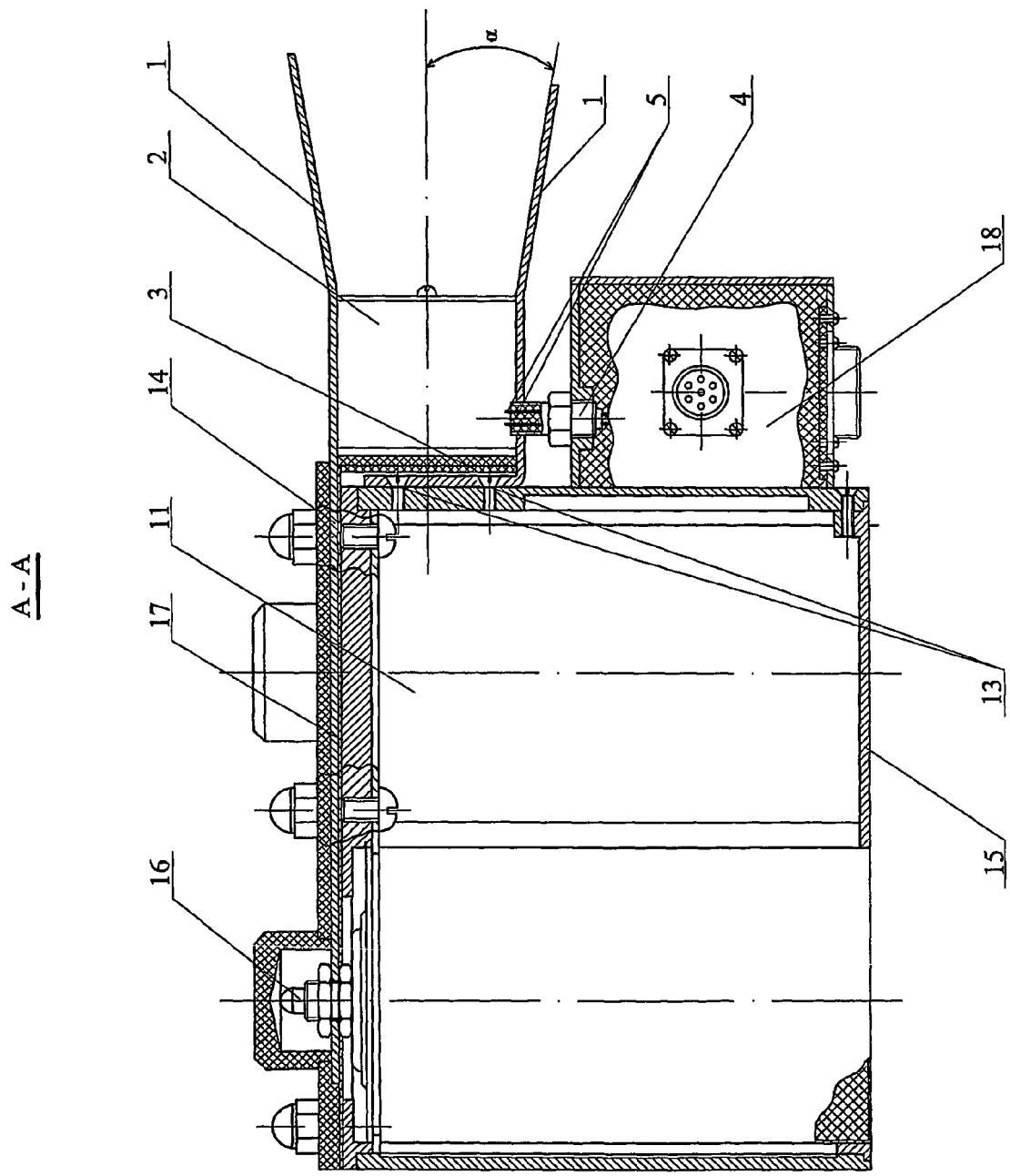
FIG. 2 shows a stepped section in A-A planes of the pulsed plasma accelerator illustrated in FIG. 1.

The description which follows is an example of the embodiment related to the construction of the pulsed plasma accelerator realized according to the present invention and a method for plasma acceleration realized by means of the pulsed plasma accelerator. The pulsed plasma accelerator presented in FIGS. 1 to 6 comprises two electrodes 1 made in the form of plates, with one of the plates serving an anode and the other plate serving a cathode. Two dielectric bars 2 of ablating material are arranged between the electrodes. In the case under discussion, an ablating material is fluoroplastic. The length of electrodes 1 exceeds the section size of dielectric bars 2 in the direction of plasma acceleration.

The walls of a discharge channel of the pulsed plasma accelerator are defined by surfaces of electrodes 1 and dielectric bars 2. One end part of the discharge channel is made open, and an end insulator 3 is arranged at the opposite end part of the channel between the electrodes 1. Refractory ceramics, such as $AL_2O_3$, is used as a material for the insulator 3. The insulator 3 is equipped with a slot facing an acceleration channel.

In the example of embodiment under discussion, the slot of the insulator 3 is defined by dielectric plates, which are bonded together in such a manner that the surface of a plate-substrate serves as an end wall of the slot in the insulator while the beveled edges of two other plates serve as side walls for this slot.

The accelerator also incorporates a discharge-initiating device 4 including two electrodes 5 of copper wire. The electrodes 5 are isolated from one another and from the electrode 1 by an isolating refractory ceramic layer. The device 4 is built into the electrode 1 and the copper wire electrodes 5 of the device 4 are facing inside the cavity of the accelerator discharge channel.

The parts of electrodes 1 arranged behind the dielectric bars 2 in the direction of plasma acceleration are positioned at an angle $\alpha=15°$ with respect to the midline of the discharge channel. The value of angle $\alpha$ is selected according to the condition: $10°\leq\alpha\leq40°$. With the above embodiment of the electrodes, the distance between the electrodes in the region of the discharge channel where the dielectric bars 2 are located is 45 mm and at the discharge channel edge—60 mm.

Also, the parts of electrodes 1 positioned rearward of the dielectric bars 2 in the direction of plasma acceleration are made continuously narrowing in the said direction. The maximal width $d_{max}$ and the minimal width $d_{min}$ of the electrodes are selected on the condition: $d_{max}/d_{min}\geq2$. In the version of embodiment under discussion the indicated ratio ($d_{max}/d_{min}$) is 7.

The sizes of one of the electrodes 1 serving as an anode exceed that of the other electrode serving as a cathode (see in Gigs 1 and 2). In the given version of the embodiment, the sizes of the anode (the length and width of the anode) exceed the respective sizes of the cathode by 10 mm. With the indicated conditions, the uniform current spreading (the uniform current density at the surfaces of electrodes) is provided with minimal sizes and weight of the pulsed plasma accelerator.

The surfaces of dielectric bars 2 facing the discharge channel are made beveled with respect to the midline of the discharge channel. The distance $b_{min}$ between the opposite surfaces of the dielectric bars on the side of the end insulator 3 and the distance $b_{max}$ between the opposite surfaces of the dielectric bars 2 on the side of the discharge channel open end are selected on the condition: $b_{max}/b_{min}\geq1.2$. In the version of the embodiment under discussion $b_{max}/b_{min}=2$.

The dielectric bars 2 are positioned for moving toward the midline of the discharge channel. Spring pushers 6 are used as means for moving the dielectric bars 2. The working surfaces of the dielectric bars 2 are held in the proper position by means of a special retainer 7 made in the form of a protrusion on the surface of electrode 1 serving as a cathode.

Figure 3:
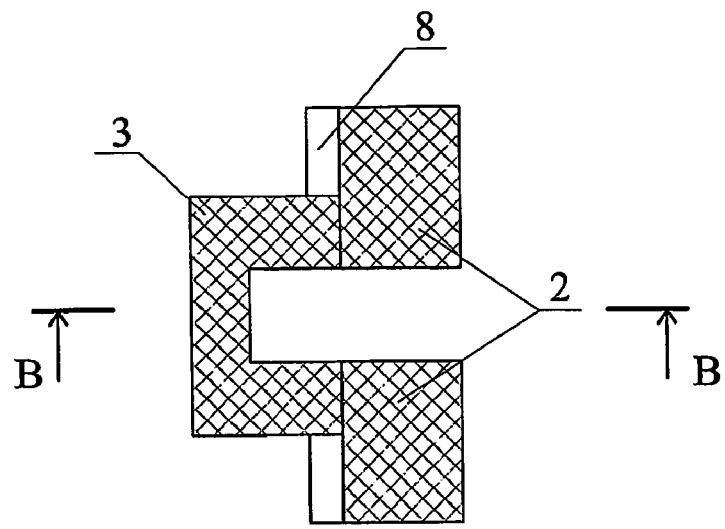
FIG. 3 shows a schematic cross-sectional view of the discharge channel in the embodiment of pulsed plasma accelerator using dielectric bars equipped with slots arranged in the region of contacting with the insulator which brings apart electrodes.
Figure 4:
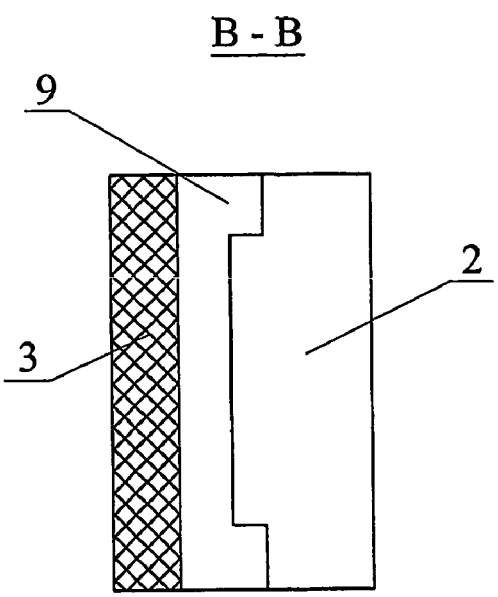
FIG. 4 shows a schematic cross-sectional view in B-B plane of the discharge channel of the pulsed plasma accelerator presented in FIG. 3.

For orienting the dielectric bars 2 along the path of movement and facilitating the uniform ablation of dielectric, recesses 8 may be executed on the side surface of bars 2 (see FIGS. 3 and 4). In this case, the insulator 3 arranged between the electrodes 1 is equipped with correspondingly shaped protrusions 9 facing the dielectric bars 2.

Figure 5:
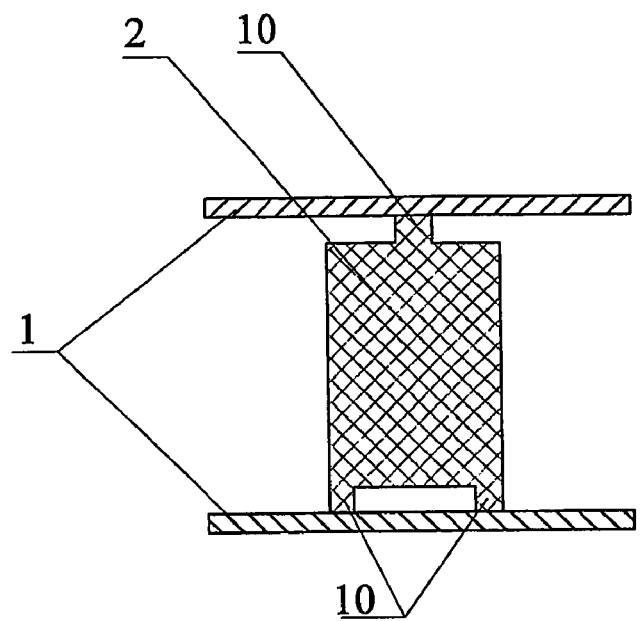
FIG. 5 shows a schematic cross-sectional view of dielectric bars equipped with longitudinal protrusions facing the electrodes of the pulsed plasma accelerator.
Figure 6:
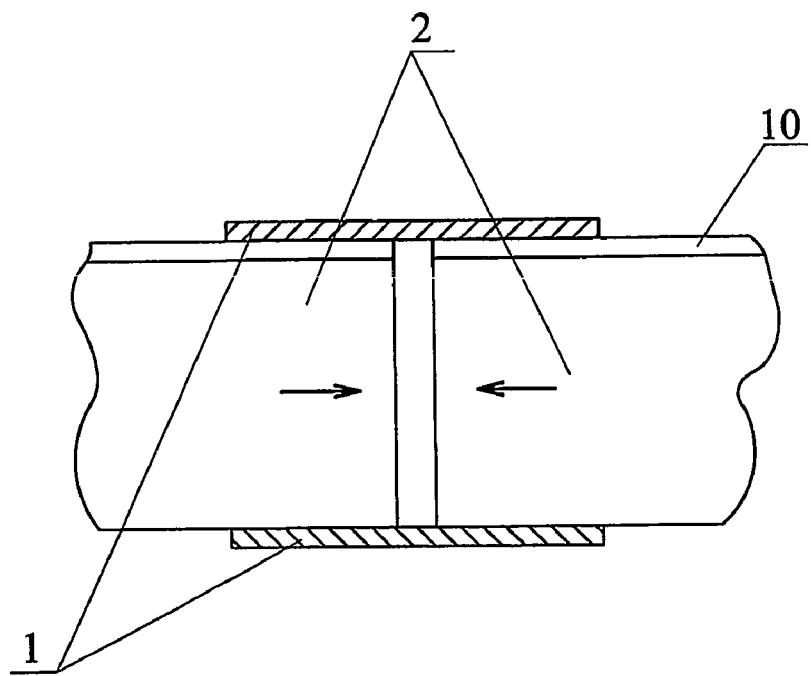
FIG. 6 shows a schematic cross-sectional view of the accelerator discharge channel, wherein dielectric bars with longitudinal protrusions are arranged according to the version of embodiment illustrated in FIG. 5.

In the version of embodiment shown in FIGS. 5 and 6, each of the dielectric bars 2 is equipped with longitudinal protrusions 10 facing the electrodes 1. Arrows in FIG. 6 show the direction of advancement of the dielectric bars 2 during operation of the pulsed plasma accelerator.

In the version of embodiment under consideration, one longitudinal protrusion 10 is formed at one side of each dielectric bar 2 facing the electrode 1 while two protrusions 10 are formed at the opposite side. The given embodiment provides, on the one hand, a stable position for the dielectric bar 2 and, on the other hand, a minimal surface of contacting with the electrode 1 to reduce ineffective consumption of the working substance.

The plasma accelerator incorporates a capacitive energy accumulator 11 including four capacitors 12, two of which being shown in FIG. 1. The energy accumulator is structurally connected to the insulator 3 and, accordingly, to the electrodes 1 by means of holding members 13 formed as socket connectors.

The plasma accelerator also includes current supplies 14 and 15 manufactured from sheet copper of at least 0.3 mm thick. One end part of the current supplies 14 and 15 is connected to electric leads 16 of the capacitors 12 and the other end part is connected to the related electrode-one of electrodes 1 of the plasma accelerator. Leads 16 of the capacitors are connected to the current supplies 14 and 15 by means of threaded connectors. In order to improve the electric contact, the threaded connectors are welded.

The current supplies 14 and 15 define in conjunction with the electrodes 1 and the energy accumulator 11 the external electric circuit of the plasma accelerator. For reducing the inductance L of the external electric circuit, the current supplies are arranged with a minimal gap there between. The required electric strength in the gap between the current supplies 14 and 15 is provided by locating in the above gap of a 0.5 mm thick dielectric fluoroplastic layer (film) 17. The given embodiment of a connecting unit for connecting the energy accumulator 11 with the electrodes 1 is conditioned by need for a minimal value of inductance L of the external electric circuit (L≦100 nH).

Power is supplied to the electrodes 5 of the discharge-initiating device by a power supply unit 18 of the electric discharge-initiating device 4.

The characteristics of the external electric circuit of plasma accelerator are selected with the provision that the efficiency of the given pulsed plasma accelerator is substantially greater than that of the prototype apparatus:

$$2 \leq C/L \leq 5,$$

where C is the electric capacitance of the external electric circuit, µF,

L is the inductance of the external electric circuit, nH, with the value of inductance being selected on condition: L≦100 nH.

It should be mentioned that the capacitance of the external electric circuit is concentrated in the immediate region of the capacitors 12 of the energy accumulator 11.

Parameters of the external electric circuit providing maximal efficiency of the plasma acceleration process in the discharge channel of the plasma accelerator are selected with the following additional conditions:

$$L = 20\text{-}100 \text{ nH}$$

The optimal values of the external electric circuit inductance and capacitance for the embodiment of the plasma accelerator under consideration are as follows:

L is about 50 nH; C is about 150 µF.

Operation of the plasma accelerator and, consequently, plasma acceleration method are performed in the following manner.

Upon starting of the pulsed plasma accelerator, an arc discharge is ignited in the accelerator discharge channel. A narrow high-voltage pulse of about 1 µs is generated in the power supply unit 18 of the electric discharge-initiating device and applied to electrodes 5 of the discharge-initiating device 4. As a result of a high-voltage electric breakdown over the surface of dielectric, a conducting plasma coagulate is created to short-circuit the electrodes 1 during movement of the coagulate in the discharge channel.

Upon ignition of the initiating discharge, an electric breakdown occurs in a main electrode-to-electrode gap between the electrodes 1, to which voltage had been preliminarily applied from the capacitors 12 of the energy accumulator 11 through the current supplies 14 and 15. The current supplies 14 and 15 are electrically isolated by means of fluoroplastic layer 17 located between the current supplies.

The magnitude of discharge voltage U is selected in the range of from 1 000 V to 2 000 V. Voltage pulses are delivered through the external electric circuit defined by the energy accumulator 11 and current supplies 14 and 15.

The plasma acceleration method is characterized in that quasi-nonperiodic pulse discharges are generated and maintained in the discharge channel of the plasma accelerator at the magnitude of discharge voltage U of at least 1 000 V and with characteristics of the accelerator external electric circuit meeting the condition:

$$2L \leq C \leq 5,$$

where C is the electric capacitance of the external electric circuit, µF;

L is the inductance of the external electric circuit, nF, with the value of said inductance being selected on the condition: L≦100 nH.

The required inductance of the external electric circuit is provided in the workable pulsed plasma accelerator by connecting the electrodes 1 immediately to the current supplies 14 and 15, which have well developed surfaces (large area), provided that the length of current supplies and the distance between current supplies and electrodes are minimal.

In the example of embodiment under consideration, the most optimal characteristics L and C of the external electric circuit were selected with regard to the achievement of a maximal plasma accelerating efficiency in accordance with the following limiting condition: the value of inductance L of the external electric circuit being selected in the range of 20-100 nH.

With the above conditions observed, the best coordination of the external and internal electric circuit parameters was stated to cause the achievement of a technical result, which was generally expressed by an increase in plasma acceleration efficiency and reduction of ineffective losses of the working substance and power.

Under the action of emission and convection from the region of electric discharge, the working substance evaporates (ablates) from the working surfaces of dielectric bars 2. The working substance is partly ionized in the discharge channel of the plasma accelerator with following acceleration of the resultant plasma coagulate by the electromagnetic and gas dynamic forces. Plasma flowing from the discharge channel of the plasma accelerator creates a reactive propulsion.

The embodiment of the end ceramic insulator 3 equipped with a slot on the side of the discharge channel allows an optimal plasma flow to be provided at the initial discharge stage, deposition of carbon on the dielectric bars to be avoided and the operating life of plasma accelerator to be eventually increased.

To make the most use of the electromagnetic effect during acceleration in the discharge channel of plasma coagulate serving as a current arc between the electrodes 1, the electrodes with the length exceeding the section size of dielectric bars 2 in the direction of plasma acceleration are used, the said electrodes being made in the form of plates.

The motion speed of a discharge spot over the surface of one of the electrodes 1 serving as an anode exceeds by about 30% the motion speed of a discharge spot over the surface of other electrode serving as a cathode. At the same time, plasma concentration in the vicinity of the dielectric bars near the surface of the electrode serving as an anode is about twice as great as that near the surface of the electrode serving as a cathode. The employment of electrodes 1, with the sizes (width and length) of one of the electrodes serving an anode differing from those of the other electrode serving as a cathode by 10 mm, allows the uniformity of current density over the surface of electrodes to be significantly increased. As a consequence of the given embodiment, the performance reliability of the pulsed plasma accelerator is increased with minimal sizes and weight of the electrodes owing to the elimination of operating modes of the plasma accelerator with the local holding of the discharge spot.

As the dielectric bars 2 are consumed in the process of ablation of their working surfaces, the bars 2 are automatically moved toward the midline of the discharge channel by means of the spring pushers 6. The dielectric bars are fixed with respect to the electrodes 1 in a proper position by means of the retainers 7.

With the evaporation of the material of dielectric bars 2, the beveled shape of their surfaces relative to the midline of the discharge channel is kept: the distance $b_{min}$ between the opposite surfaces of the dielectric bars on the side of the insulator and the distance $b_{max}$ between the opposite surfaces of the dielectric bars on the side of the open end of the discharge channel satisfy the condition: $b_{max}/b_{min} \geq 1.2$.

The above embodiment of the dielectric bars 2 allows the plasma acceleration process to be stabilized in time by preliminary imparting to the discharge channel of the shape close to the optimal configuration.

The embodiment of the end ceramic insulator 3 arranged between the electrodes 1 and equipped with the protrusions 9 (see FIGS. 3 and 4) facing the dielectric bars 2 and the embodiment of the dielectric bars 2 equipped with recesses 8 configured to conform with the shape of the protrusions 9 allow deposition of carbon on the surface of the leading end of the dielectric bars 2 to be avoided. It is known that carbon as a component of a composition of the working substance-fluoroplastic evaporates, accompanied by deposition on the working surfaces of the bars 2 at the initial operating mode of the accelerator. The given phenomenon hinders the establishment of an optimal mode of consumption of the working substance owing to the non-uniform ablation of the surfaces of bars 2.

The embodiment of the dielectric bars using longitudinal protrusions 10 (see FIGS. 5 and 6) facing the electrodes 1 allows the main part of the relatively cold bar 2 to be separated from hot electrodes. This results in the reduced influence of the so-called "evaporation aftereffect" of the dielectric bars 2. The above effect is due to the evaporation of fluoroplastic from the surface of the overheated bar during the pulsed discharge intervals. In this case, the efficiency of plasma acceleration process is substantially reduced since a significant part of the working substance is accelerated during the voltage pulse intervals only by a gas dynamic pressure.

The results of experimental investigations have shown that with the advent of a gap between the bars 2 and the hot electrodes 1, the consumption of the working substance may be reduced by 15-25% depending on the energy applied to a discharge while plasma acceleration efficiency may be respectively increased.

Usage of the electrodes 1, with the part thereof on the side of the discharge channel outlet end made continuously narrowing in the direction of plasma acceleration, allows the linear inductance of the discharge channel to be increased and the plasma acceleration efficiency to be improved by 10-12% as compared to electrodes rectangular in plan owing to the improved coordination of external and internal electric circuit parameters. It should be pointed out that an increase in the inductance of the internal electric circuit is more effective as compared to a reduction in the inductance of the external electric circuit, which is carried out for coordinating the parameters of the internal and external electric circuits.

An additional increase in the linear inductance of the discharge channel and, accordingly, an increase in the efficiency of plasma acceleration has been shown with the use of electrodes 1 whose outlet parts arranged behind the dielectric bars 2 in the direction of plasma acceleration are positioned at an angle α with respect to the midline of the channel. The optimal value for the angle α is selected on the condition: $10° \leq \alpha \leq 40°$.

An increase in the share of the working substance accelerated by the electromagnetic force with the total reduction in the consumption of the working substance is provided on the whole because characteristics of the external electric circuit are selected on the basis of the condition: $2 \leq C/L \leq 5$, where C is the electric capacitance of the external electric circuit, µF;

L is the inductance of the external electric circuit, nH, with the value of inductance being selected on the condition: $L \leq 100$ nH, at the discharge voltage U of at least 1 000 V.

With the above conditions, quasi-nonperiodic pulsed discharges are generated and maintained in the discharge channel of the pulsed plasma accelerator owing to the approximation of external and internal electric circuit impedance values. The given result allows the plasma acceleration efficiency to be substantially increased by more advantageous usage of the working substance and reduced ineffective energy losses in the external electric circuit, primarily in the energy accumulator. Also, the reduced heating of the energy accumulator due to the decreased energy losses allows the performance parameters and service life of the accelerator to be increased.

The efficiency of plasma acceleration in the pulsed plasma accelerator (the propulsive efficiency of an accelerator-propulsion) with the use of the pulsed plasma accelerator and plasma acceleration method allowing the above conditions to be realized, at the discharge energy in the range of 20-150 J may be increased up to 12-35% as compared to the efficiency of 6-16% typical for the known analogs of plasma accelerators and plasma acceleration methods.

Figure 7:
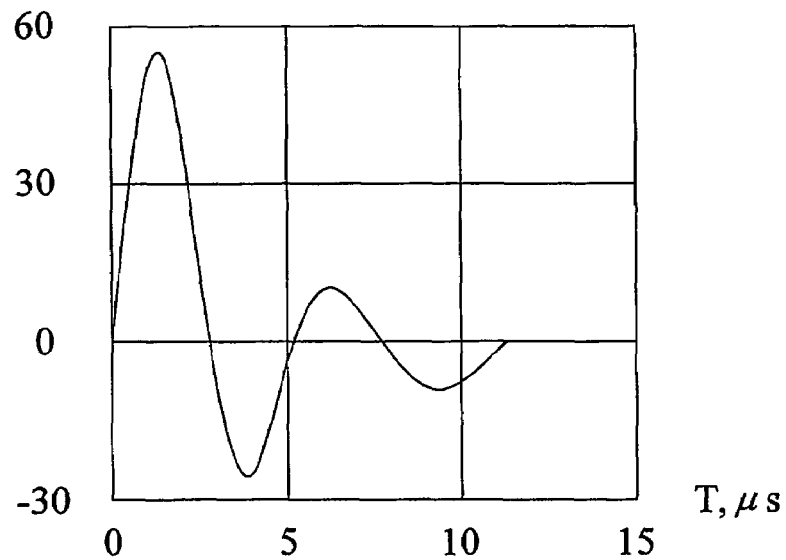
FIG. 7 is a graphic representation of a dependence of a variation in the discharge current I measured in kA during time T of a current pulse measured in µs for a prototype pulsed plasma accelerator.
Figure 8:
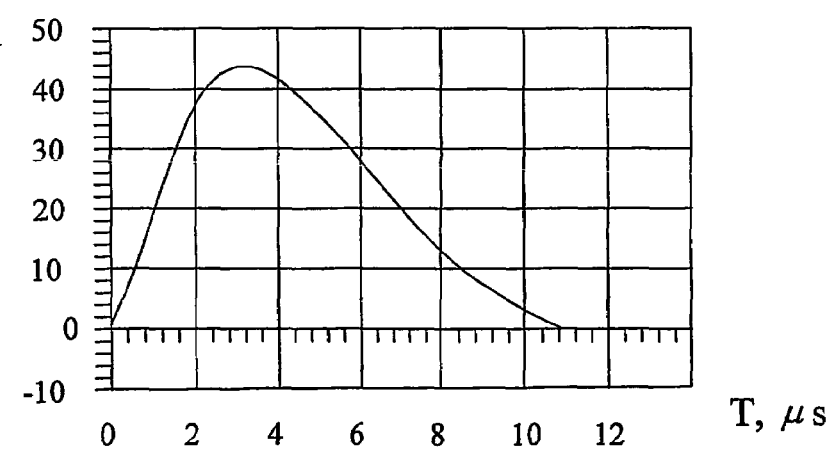
FIG. 8 is a graphic representation of a dependence of a variation in the discharge current I measured in kA during time T of a current pulse measured in µs for the pulsed plasma accelerator of the present invention.
Figure 9:
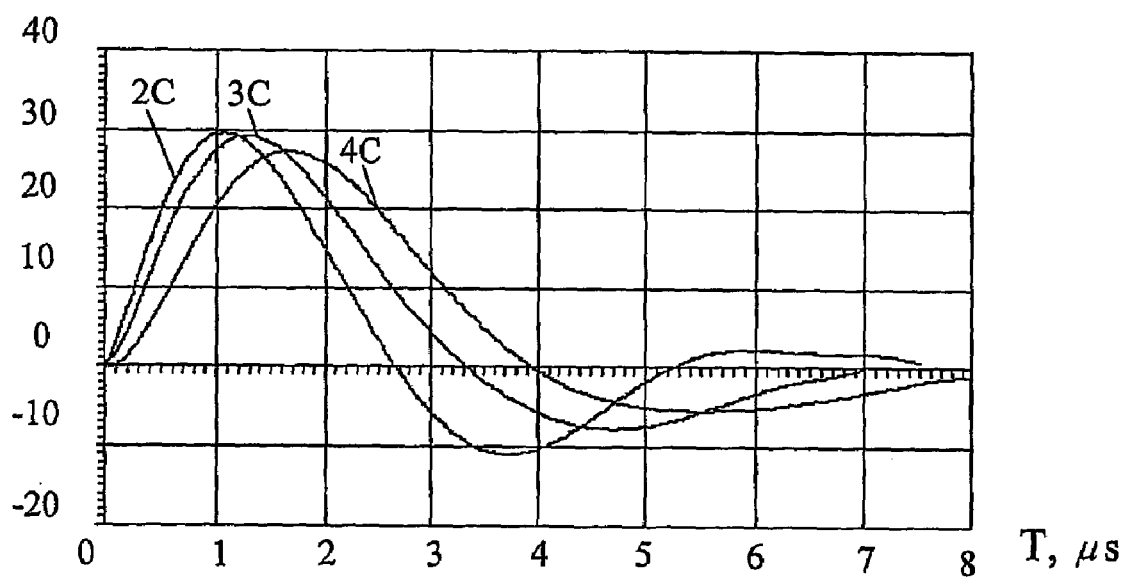
FIG. 9 is a graphic representation of dependencies of a variation in discharge current I measured in kA during time T of a current pulse measured in µs for different C and L parameter ratios of an external electric circuit of a pulsed plasma accelerator.

The achievement of the above technical result with the use of the invention is supported by the obtained experimental data (see FIGS. 7 to 9).

Presented in FIGS. 7 and 8 are the curves of variations in the discharge current I (kA) during the current pulse time T (µs) with the energy W of 100 J accumulated in the energy accumulator 8, the said curves being obtained during operation of a prototype pulsed plasma accelerator (FIG. 7) and the claimed pulsed plasma accelerator (FIG. 8).

It follows from the represented graphic dependences that in the first case (see FIG. 7) the curve of the discharge current I is an attenuating sinusoid in shape with four one-half periods, the maximal current amplitude approaching 60 kA and the first one-half period time of about 3 µs.

In the second case (see FIG. 8), vibrations of the discharge current I attenuate during one one-half period of vibration. The analysis of the process has shown that after the first discharge of the accumulator, less than 15% of the stored energy remains therein. The amount of energy remaining in the accumulator is not sufficient for providing the second breakdown of the discharge gap during the pulsed discharge of the accumulator. The maximal amplitude of current during the first one-half period is about 43 kA and the time of the first one-half period is about 10 µs.

The results of investigations presented in FIG. 9 are oscillograms of the discharge current I of a pulsed plasma accelerator. The given pulsed plasma accelerator was used to realize the claimed plasma acceleration method. The amount of energy stored in the energy accumulator was 20 J. Investigations were performed for various C and L parameter ratios of the external electric circuit of the pulsed plasma accelerator. Three versions of external circuits for the pulsed plasma accelerator were subject to investigations: the electric circuit included two capacitors (not forming part of the invention) or three or four capacitors. The curves "2C", "3C" and "4C" depicted in FIG. 9 correspond to the above versions of the external electric circuit.

The C and L parameter ratio changed in accordance with the energy accumulator capacitance value for each of the above versions of the external electric circuit.

The C/L parameter ratio for the curve "2C" was 1, for the curve "3C"—2.6, and for the curve "4C"—3.7. The plasma acceleration efficiency (the propulsive efficiency of a pulsed plasma accelerator—propulsion) for three versions of the external electric circuit of the pulsed plasma accelerator was 6.0% (the curve "2C"), 9% (the curve "3C") and 11% (the curve "4C"), respectively.

It had been established on the basis of investigations that a significant increase in plasma acceleration efficiency was exhibited in case the general conditions for selecting the external circuit characteristics of the pulsed plasma accelerator were as follows: $2 \leq C L \leq 5$, where C is the electric capacitance of the external electric circuit, µF, L is the inductance of the external electric circuit, nH, with the value of inductance being selected on the condition: $L \leq 100$ nH.

Also, characteristics of the pulsed plasma accelerator were investigated with different values of energy accumulated in the accumulator. With the stored energy value W=20 J, the maximal plasma acceleration efficiency was 11%, with W=60 J—20%, with W=100 J—27% and with W=150 J—33%. Variations in characteristics of the pulsed plasma acceleration with the larger values W were estimated by approximating the dependences resulted from the experiments in the range of high values of energy stored in the accumulator.

The resultant data suggest that the efficiency of the plasma acceleration process accomplished by means of an embodiment of the claimed pulsed plasma accelerator and realized in accordance with the claimed method is twice as large as the propulsive efficiency of the known analogues with equal values of energy stored in the accumulator.

The Table below represents the results of comparative investigations of pulsed plasma accelerators, i.e., the prototype and an embodiment of the claimed pulsed plasma accelerator used for realizing the claimed plasma acceleration method. The nominal capacitance of energy accumulators (capacitor batteries) of the accelerators under comparison was established at the equal level W=100 J.

TABLE

| Basic characteristics of pulse plasma accelerators | Pulse plasma accelerator - prototype | Pulse plasma accelerator claimed |
|---|---|---|
| Single propulsive pulse, H · s | $2.3 \cdot 10^{-3}$ | $2.8 \cdot 10^{-3}$ |
| Consumption of working substance, kg/pulse | $1.9 \cdot 10^{-7}$ | $1.5 \cdot 10^{-7}$ |
| Specific impulse, s | $1.25 \cdot 10^{3}$ | $1.85 \cdot 10^{3}$ |
| Maximal plasma acceleration efficiency (propulsive efficiency of pulse plasma accelerator-propulsion), % | 14 | 26 |

It follows from the above experimental data that though the basic characteristics of the prototype pulsed plasma accelerator are higher than those of the majority known analogs, the said characteristics are much lower than the respective characteristics of the claimed pulsed plasma accelerator.

The claimed pulsed plasma accelerator and plasma acceleration method provide for higher plasma acceleration efficiency owing to the involvement of the larger part of the working substance in the electromagnetic acceleration process, as compared to the known analogues, with the result that ineffective consumption of the working substance is eliminated and energy losses in the external electric circuit are reduced. The achievement of the above technical result allows the field of application of the pulsed plasma accelerator to be significantly widened, the performance reliability of the accelerator to be enhanced under the conditions of strict limitations with regard to the weight and size characteristics, and operational costs to be reduced.

INDUSTRIAL APPLICABILITY OF THE INVENTION

The pulsed plasma accelerator and plasma acceleration method realized by means of the pulsed plasma accelerator may have applications in various fields of technique. The pulsed plasma accelerator and plasma acceleration method may be primarily employed in electric propulsion equipment for spacecrafts. In addition to that, the pulsed plasma accelerator may be used for performing in outer space of various experiments demanding generation of high-speed plasma flows.

Furthermore, the invention may find a wide utility in surface treatment processes, deposition processes, as well as in producing of novel composite materials. Another important trend in applying of the invention is performing land-based experimental investigations and testing of the latest samples of equipment by simulating the effects of high-speed plasma flows upon the objects under investigation.

Although the above example is the preferred embodiment, the invention includes all the embodiments falling within the scope of the appended claims, which may be realized by means of the equipment and methods well known to those skilled in the art.

What is claimed is:

1. A pulsed plasma accelerator comprising two electrodes (1), dielectric bars (2) arranged between the electrodes and made from an ablating material, a discharge channel with an open end part, with discharge channel walls being defined by the surfaces of electrodes (1) and of dielectric bars (2), an energy accumulator (11), current supplies (14,15) for connecting of the electrodes (1) with the energy accumulator (11), which together with the electrodes (1) and the energy accumulator (11) define an external electric circuit, an insulator (3) arranged between the electrodes (1) at the end part of the discharge channel opposite to the open end part, and a discharge-initiating device (4), characterized in that the characteristics of the external electric circuit of the accelerator are selected on condition: $2 \leq C/L \leq 5$, where C is the electric capacity of the external electric circuit, µF, L is the inductance of the external electric circuit, nH, with the value thereof meeting the condition: $L \leq 100$ nH.

2. The accelerator of claim 1, wherein the inductance of the external electric circuit is selected in the range of L=20-100 nH.

3. The accelerator of claim 1, wherein the electrodes (1) are made in the form of plates.

4. The accelerator of claim 1, wherein the length of the electrodes (1) exceeds the section size of the dielectric bars (2) in the direction of plasma acceleration.

5. The accelerator of claim 1, wherein the dielectric bars are adapted for advancement toward the discharge channel midline, with the accelerator being equipped with a retainer (7) for retaining the dielectric bars (2) in a proper position and a device (6) for advancing said dielectric bars.

6. The accelerator of claim 1, wherein the insulator (3) arranged between the electrodes (1) is provided with a slot facing an acceleration channel.

7. The accelerator of claim 1, wherein the insulator (3) arranged between the electrodes (1) is provided with protrusions (9) facing the dielectric bars (2), and the dielectric bars (2) are provided with recesses (8) configured to conform the shape of protrusions (9) of the insulator (3).

8. The accelerator of claim 1, wherein each of the dielectric bars (2) is provided with at least one longitudinal protrusion (10) facing the electrode (1).

9. The accelerator of claim 1, wherein the surfaces of the dielectric bars (2) facing the discharge channel are beveled with respect to the midline of the discharge channel so that the distance $b_{min}$ between the opposite surfaces of the dielectric bars (2) on the side of the insulator (3) and the distance $b_{max}$ between the opposite surfaces of the dielectric bars (2) on the side of the open end of the discharge channel satisfy the condition: $b_{max}/b_{min} \geqq 1.2$.

10. The accelerator of claim 1, wherein the parts of the electrodes (1) arranged behind the dielectric bars (2) in the direction of plasma acceleration are positioned at an angle α with respect to the discharge channel midline, with the value of angle α being selected on condition: $10° \leqq \alpha \leqq 40°$.

11. The accelerator of claim 1, wherein the parts of the electrodes (1) arranged behind the dielectric bars (2) in the direction of plasma acceleration are made continuously narrowing in the said direction, with the maximal width $d_{max}$ and minimal width $d_{min}$ of the electrodes (1) are selected according to the condition: $d_{max}/d_{min} \geqq 2$.

12. The accelerator of claim 1, wherein the length and width of one of the electrodes (1) serving as an anode exceeds the length and width of other electrode (1) serving as a cathode.

13. A method for plasma acceleration including the steps of igniting a discharge in the discharge channel of the plasma accelerator by means of a discharge-initiating device (4) and pulsed applying of discharge voltage from an energy accumulator (11) via an external electric circuit to electrodes (1) of the plasma accelerator between which are arranged dielectric bars (2) made from ablating material, characterized in that quazi-nonperiodic pulse discharges are ignited and maintained in the discharge channel at the discharge voltage U of at least 1 000 V and the characteristics of the external electric circuit satisfying the condition: $2 \leqq C/L \leqq 5$, where C is the electric capacitance of the external electric circuit, µF, and L is the inductance of the external electric circuit, nH, with the capacitance value satisfying the condition: $L \leqq 100$ nH.

14. The method of claim 13, wherein the quazi-nonperiodic discharges are ignited and maintained with the discharge voltage U=1 000-2 000 V.

15. The method of claim 13, wherein the inductance L of the external electric circuit is selected in the range of L=20-100 nH.

16. The method of claim 13, wherein plasma acceleration is provided by means of electrodes (1) made in the form of plates.

17. The method of claim 13, wherein plasma acceleration is provided by means of electrodes (1) having length exceeding the section size of dielectric bars (2) in the direction of plasma acceleration.

18. The method of claim 13, wherein in the process of plasma acceleration, the dielectric bars (2) are movable toward a midline of the discharge channel until they are fixed with respect to the surface of the electrodes (1).

19. The method of claim 13, wherein plasma acceleration is provided in the discharge channel wherein the surfaces of the dielectric bars (2) are made beveled with respect to the discharge channel midline so that the distance $b_{min}$ between the opposite surfaces of the dielectric bars (2) on the side of the insulator (3) and the distance $b_{max}$ between the opposite surfaces of the dielectric bars (2) on the side of the open end of the discharge channel satisfy the condition: $b_{max}/b_{min} \geqq 1.2$.

20. The method of claim 13, wherein plasma acceleration is provided in the discharge channel, wherein the parts of electrodes (1) arranged behind the dielectric bars (2) in the direction of plasma acceleration are positioned at an angle α to the discharge channel midline, with the value of angle α being selected on the condition: $10° \leqq \alpha \leqq 40°$.

21. The method of claim 13, wherein plasma acceleration is provided in the discharge channel, wherein the parts of electrodes (1) arranged behind the dielectric bars (2) in the direction of plasma acceleration are made continuously narrowing in the said direction, with the maximal width $d_{max}$ and the minimal width $d_{min}$ of the electrodes (1) are selected on the condition: $d_{max}/d_{min} \geqq 2$.

22. The method of claim 13, wherein plasma acceleration is provided in the discharge channel defined by the insulator (3) wherein a slot is formed on the side of the discharge channel.

23. The method of claim 13, wherein plasma acceleration is provided in the discharge channel wherein the width and length of one of electrodes (1) serving as an anode exceeds those of other electrode (1) serving as a cathode.

* * * * *